Sept. 19, 1944.    E. A. MILLER    2,358,728
PERMANENT ANCHORING MEANS FOR THE ASSEMBLY OF INTERDRIVEN MEMBERS
Filed Jan. 14, 1941
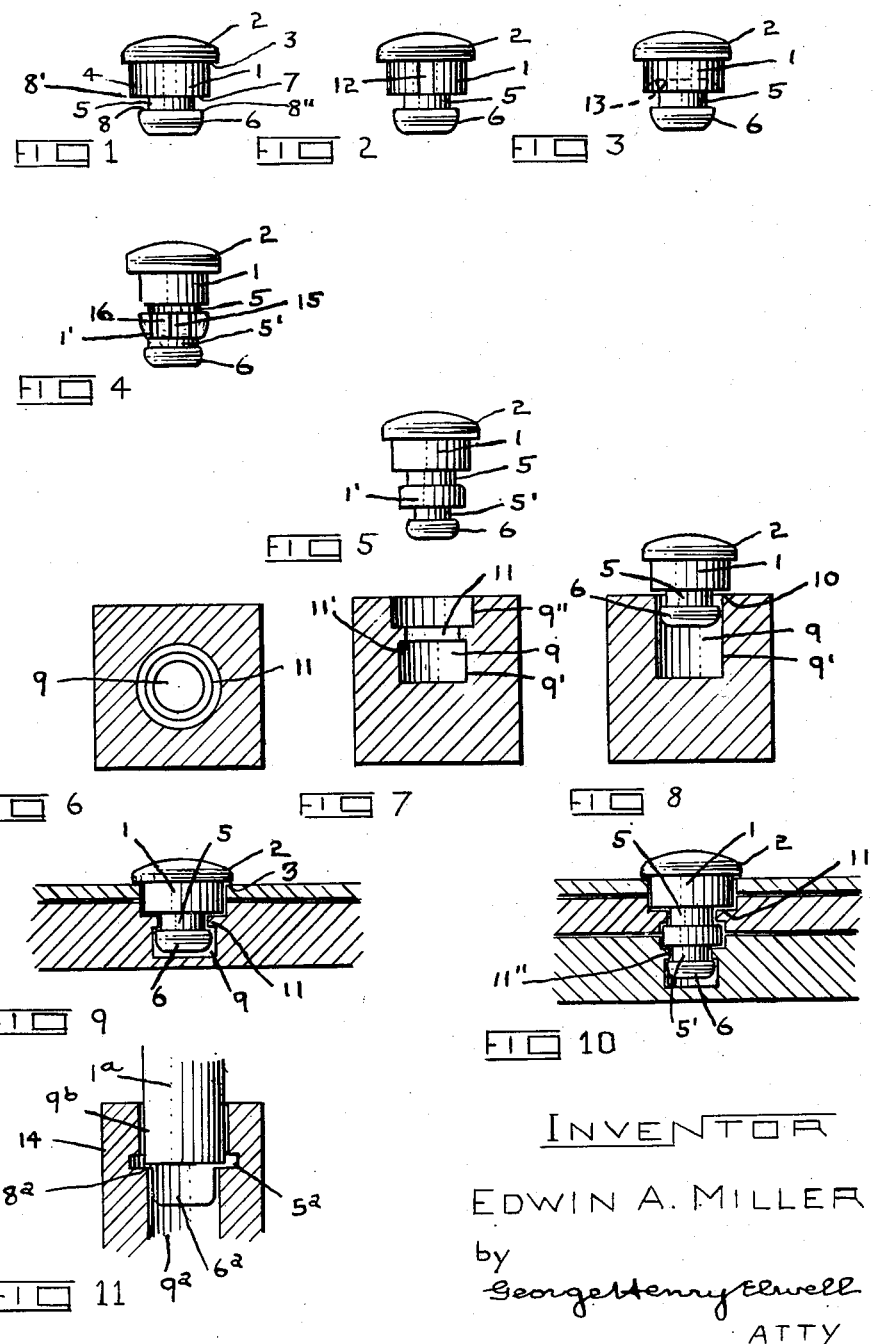
INVENTOR
EDWIN A. MILLER
by
George Henry Elwell
ATTY Patented Sept. 19, 1944

2,358,728

UNITED STATES PATENT OFFICE 2,358,728

PERMANENT ANCHORING MEANS FOR THE ASSEMBLY OF INTERDRIVEN MEMBERS

Edwin August Miller, New Haven, Conn.

Application January 14, 1941, Serial No. 374,363

1 Claim. (Cl. 85—21)

This invention relates to permanent anchoring means for the assembly of relatively opposing interdriven members and more especially to a driven member integrally carrying means adapted to operate upon a contacting wall of another member to thereby establish integrally thereon a transverse annular rib for interlocking engagement with a shoulder of the driven member.

The objects of the invention therefore are to provide a positive and permanent interlocking means for axially relatively driven members of which one member is adapted for partial insertion within a snug passage of the other member; to provide the wall surface of one of said members with a cutting and forming means for operation upon the contacting wall surface of the other member; and to provide an axially interlocking anchorage for relatively driven members of which friction as a binding feature is an immaterial factor.

In the accompanying drawing the Figure 1 is an upright view of the improved device; Figure 2 is a similar view but illustrated with a key-slot; Figure 3 is another similar view but with an internally enlarged slot base; Figure 4 is an upright view of a multiple slot device separated by axially tapered and channeled periphery; Figure 5 is an upright view of the improved device provided with multiple grooves; Figure 6 is a top view of a block in cross-section illustrating an operated bore; Figure 7 is a side view of a block in cross-section illustrating an operated bore; Figure 8 is a side view of a block in cross-section illustrating the initial insertion of the operating member within a bore; Figure 9 is an upright view of the device illustrating two bars, each in cross-section and permanently interlocked by means of the improved device; Figure 10 is an upright view of the device having multiple slots and illustrating three bars, each in cross-section and permanently interlocked by means of the improved device; and the Figure 11 is a cross-section of a modified form of the improved device in which the improvement is illustrated as being carried by a tubular member internally and in initial operating relation with the exterior wall surface of a round bar.

Referring more particularly to the accompanying drawing the numeral 1 designates the shank of a driving member having the head 2 providing the abrupt shoulder 3 overhanging the periphery 4 of the shank 1. The groove 5, of which the depth, width and location upon the shank 1 are important factors to be predetermined at the time of production as hereinafter explained, is provided around the shank 1 by cutting therein, and the pilot 6, being of less diameter than that of the shank 1, determines the diameter of the bore into which the pilot 6 is to be inserted. The greater diameter of the upper side wall 7 of the groove 5, as distinguished from the lesser diameter of the lower side wall 8 of the groove 5, provides the over-hanging cutting and forming means 8' of the device in its relation to a bore of lesser diameter, while the annular edge of the lower side wall 8 of the groove 5 is slightly rounded as at 8''.

In operation, the pilot 6 is inserted within the bore 9 prepared therefor, as illustrated by the Figure 8, a marginal portion of the side wall 7 of the groove 5 resting upon a corresponding marginal portion of the rim 10 of the bore 9. Hammer blows, or an equivalent amount of force, is then directed upon the head 2 of the shank 1 with the result that, as the shank 1 is driven within and enlarges the diameter of the bore 9, the cutting and forming edge 8' cuts, accumulates and crowds the displaced metal into the groove 5 with the effect that such dispaced and packed metal within the groove 5 forms a metal ring 11 within the bore 9 by which process the ring 11 is established as an integral part of the bore 9 at a place therein separating that portion of the bore 9 housing the pilot 6 within the normal diameter 9' of the bore 9 and the enlarged diameter 9'' thereof. By actual experiment it has been established that the ring 11, in the process of its making, gradually advances farther into the bore 9 as the shank 1 is forced therein and enlarges the normal diameter of the bore 9 until the groove 5 is packed full with displaced metal and then, even through the shank 1 is not fully driven home within the bore 9, it cannot be forced farther; for when the ring 11 completely fills the groove 5 the ring 11 cannot be moved either way and hence becomes a positive anchorage as between the shank 1 and the bore 9 in that the opposing annular shoulders 8 and 8' of the pilot 6 and the ring 11, respectively, are relatively interlocked. It is because the ring 11, when fully packed within the groove 5 cannot be moved farther into the bore 9, that the possible cubic content of the groove 5 must be so predetermined that it will not become packed until the shank 1 is driven fully home.

The Figure 2 illustrates the improved device with an additional axially formed key-slot 12, perpendicular to the groove 5, as a key into which displaced metal may flow and form to prevent the shank 1 swivelling within the bore 9, but at the same time such key-slot 12 provides greater storage room for displaced metal and therefore must be taken into consideration when predetermining the depth and width of the groove 5 with regard to a particular use.

The Figure 3 illustrates how a groove 5 of a given depth and width may be provided by means of the undercut 13 for a greater accommodation for an increased cubic content of the displaced metal.

The Figures 4 and 5 each illustrate a shank 1 with double grooves 5 and 5', the added groove 5' being of less diameter than that of the groove 5, and the shank portion 1' being of less diameter than that of the shank 1, the utility of this form of the improved device is illustrated by the Figure 10 where three bars of metal are relatively secured by means of the rings 11 and 11'' of the device illustrated by the Figure 5, otherwise the principle is the same as previously described with regard to the Figure 9 where two bars are shown to be relatively secured by means of the ring 11. It will be noted that, in the illustration of the Figure 9, the top bar relies upon the shoulders 3 of the head 2 for its securement in the assembly, but not so with regard to the lower two bars illustrated by the Figure 10; for they are each separately locked in their relative positions by means of a formed ring 11 and 11'', respectively, integral with their respective bars. The peculiar structure shown in the Figure 4 is an axially tapered shank 1' with its periphery channeled as at 15 as another form of key means to prevent swivelling of the device within the bore 9, the tapered ribs, formed by the channeling, being adapted to follow the pilot 6 into the bore 9.

While in actual practice one could not see within a formed bore, formed by means of the improved device as illustrated by the Figure 1, unless the device be chipped out of the bore yet, as illustrated by the Figures 6 and 7, there is shown what work within the bore 9 is accomplished by the driving member of the device.

The Figure 11 illustrates a modification of the improved device wherein the cutting and forming means are carried by the internal wall of a tubular member 14 and the work thereby performed upon the exterior wall of the shank member 1ª. This tubular member 14 is provided with the internal groove 5ª, the bore 9ª below the groove 5ª being the normal diameter of the bore 9ª fitting the diameter of the pilot 6ª while the portion of the bore 9ᵇ is enlarged to fit the greater diameter of the shank 1ª. With the parts relatively placed as illustrated by the Figure 11, assembling force will cause the cutting and forming shoulders 8ª to displace from the shank's periphery accumulated metal that becomes packed within the groove 5ª and thereby forming and establishing a ring integral with the shank 1ª and locked within the groove 5ª of the tubular member 14.

I claim:

A permanent anchoring means for the assembly of relatively opposing interdriven members, said means comprising a shank having a shouldered head; a pilot integral with, and having a lesser diameter than that of, the shank; a transverse groove formed within the periphery of the shank immediately adjacent the pilot, the said groove having a side wall providing an abrupt locking shoulder; an axially extending key-slot provided in the periphery of the shank and communicating with the transverse groove; and means, provided by the periphery of the shank at the other side wall of the groove, adapted to operate upon and to marginally cut and accumulate surface displacement of metal of the wall of the bore into which the shank is driven as the assembly advances and to pack said accumulation within said transverse groove and the axial key-slot to provide the interconnected transverse ring and axial rib integral with the wall of the bore, said transverse ring providing an abrupt locking shoulder opposing said other locking shoulder upon the completion of the assembly.

EDWIN AUGUST MILLER.